(12) United States Patent
Chung

(10) Patent No.: US 9,896,869 B2
(45) Date of Patent: Feb. 20, 2018

(54) HINGE FOR GRILL

(71) Applicant: Kiosky Chung, Taichung (TW)

(72) Inventor: Kiosky Chung, Taichung (TW)

( * ) Notice: Subject to any disclaimer, the term of this patent is extended or adjusted under 35 U.S.C. 154(b) by 60 days.

(21) Appl. No.: 15/145,720

(22) Filed: May 3, 2016

(65) Prior Publication Data

US 2017/0321461 A1    Nov. 9, 2017

(51) Int. Cl.
*E05D 5/02* (2006.01)
*E05D 5/00* (2006.01)
*E05D 3/02* (2006.01)
*A47J 37/07* (2006.01)

(52) U.S. Cl.
CPC .............. *E05D 5/00* (2013.01); *E05D 3/02* (2013.01); *E05D 5/02* (2013.01); *A47J 37/0786* (2013.01); *E05Y 2900/30* (2013.01)

(58) Field of Classification Search
CPC .... E05D 3/02; E05D 5/00; E05D 5/02; E05D 2700/04; A47J 37/0786; E05Y 2900/30
USPC .......................................................... 16/387
See application file for complete search history.

(56) References Cited

U.S. PATENT DOCUMENTS

| | | | | |
|---|---|---|---|---|
| 1,821,606 A * | 9/1931 | Anderson | ............... | E05D 3/02 16/384 |
| 2,137,529 A * | 11/1938 | Ferris | .................. | E05D 3/02 16/386 |
| 2,166,815 A * | 7/1939 | Jones | .................. | E05D 3/02 16/223 |
| 2,315,488 A * | 4/1943 | Aldeen | ................. | E05D 3/02 16/380 |
| 2,648,870 A * | 8/1953 | Wilhelmi | .............. | E05D 3/02 16/390 |
| 3,663,987 A * | 5/1972 | Hawkins | ............... | E05D 5/06 16/387 |
| 4,864,688 A * | 9/1989 | Gerber | ................. | E05D 3/02 16/261 |
| 7,814,621 B1 * | 10/2010 | Radke | ............... | E05D 11/1014 16/230 |
| 7,861,379 B2 * | 1/2011 | Peters | ............... | E05D 11/0027 16/319 |
| 2013/0283567 A1 * | 10/2013 | Yamaguchi | ........ | E05D 7/1044 16/260 |

* cited by examiner

Primary Examiner — Roberta S Delisle

(57) ABSTRACT

A hinge is used to connect a cover to a bowl of a grill so that the cover is pivoted relative to the bowl between a closing position and an opening position. The hinge includes two leaves and a fastener. The first leaf includes a first terminal portion connected to the bowl, a second terminal portion, and a middle portion formed between the first and second terminal portions. The second leaf includes a first terminal portion connected to the cover, a second terminal portion, and a middle portion formed between the first and second terminal portions thereof. The fastener connects the second terminal portion of the first leaf to the second terminal portion of the second leaf.

5 Claims, 4 Drawing Sheets

US 9,896,869 B2

HINGE FOR GRILL

BACKGROUND OF INVENTION

1. Field of Invention

The present invention relates to a grill and, more particularly, to a hinge for connecting a cover to a stove of a grill.

2. Related Prior Art

U.S. Pat. No. 5,355,558 discloses a hinge assembly for a grill 10. The grill 10 includes a base 12 connected to a cover 14 by the hinge assembly so that the cover 14 is moveable between a closing position and an opening position relative to the base 12. The hinge assembly includes two hinges 16 each including two hinge arms 18 and 20. A first end 22 of the first hinge arm 18 is connected to the cover 14 by a rivet 26. A second end 24 of the first hinge arm 18 is connected to the cover 14 by a rivet 26. A first end 22 of the first hinge arm 18 is connected to the base 12 by a rivet 28. A first end 30 of the second hinge arm 20 is connected to the cover 14 by a rivet 34. The second hinge arm 20 includes a slot 38 near a second end 32. The slot 38 receives a rivet 36 connected to the first hinge arm 16. The rivet 36 is movable between two closed ends of the slot 38. Hence, the movement of the cover 14 relative to the base 12 includes translation and rotation. The rivet 36 is located at the first closed end of the slot 38 as the cover 14 is in the closing position. The rivet 36 is located at the second closed end of the slot 38 when the cover 14 is in the opening position. Thus, an edge 15 of the cover 14 is a little more than 90° from an edge 13 of the base 12 when the cover 14 is in the opening position. The movement of the cover 14 relative to the base 12 is not smooth because the translation interferes with the rotation.

U.S. Pat. No. 5,394,590 discloses a hinge assembly for a grill. The grill includes a cover 10 connected to a bowl 20 by the hinge assembly so that the cover 10 is moveable between a closing position and an opening position relative to the bowl 20. The hinge assembly includes two hinges each including two hinge members 30 and 40. The bowl 20 includes a slot 21. A first end 301 of the first hinge member 30 is connected to the cover 10 by a screw. A connecting element 50 is connected to a second end 302 of the first hinge member 30. A first end 401 of the second hinge member 40 is connected to the cover 10 by a screw. The second hinge member 40 includes a slot 41 near a second end 402. The connecting element 50 is inserted in the slots 21 and 41. The connecting element 50 is movable in the slots 21 and 41. Hence, the movement of the cover 10 relative to the bowl 20 includes translation and rotation. The connecting element 50 is located at a closed end of the slot 21 and a closed end of the slot 41 as the cover 10 is in the opening position. The connecting element 50 is located at another closed end 22 of the slot 21 and another closed end of the slot 41 when the cover 10 is in the closing position. The movement of the cover 10 relative to the bowl 20 is not smooth because the translation interferes with the rotation.

U.S. Pat. No. 6,253,760 discloses a barbecue device including a lid 16 connected to a bowl 14 by a hinge mechanism so that the lid 16 is moveable between a closing position and an opening position relative to the bowl 14. The hinge mechanism includes two hinges each including a front hinge member 36 and a rear hinge member 38. A pivot is used to connect an end of the front hinge member 36 to a bracket 40 connected to the bowl 14. Another pivot is used to connect another end of the front hinge member 36 to a bracket 42 connected to the lid 16. Another pivot is used to connect an end of the rear hinge member 38 to the bracket 40. Another pivot is used to connect another end of the rear hinge member 38 to the bracket 42. The provision of the brackets 40 and 42 and the connection thereof to the bowl 14 and the lid 16 increase the cost of the barbecue device.

The present invention is therefore intended to obviate or at least alleviate the problems encountered in prior art.

SUMMARY OF INVENTION

It is the primary objective of the present invention to provide a reliable hinge for connecting a cover to a bowl of a grill.

To achieve the foregoing objective, the hinge includes two leaves and a fastener. The first leaf includes a first terminal portion connected to the bowl, a second terminal portion, and a middle portion formed between the first and second terminal portions. The second leaf includes a first terminal portion connected to the cover, a second terminal portion, and a middle portion formed between the first and second terminal portions thereof. The fastener connects the second terminal portion of the first leaf to the second terminal portion of the second leaf.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
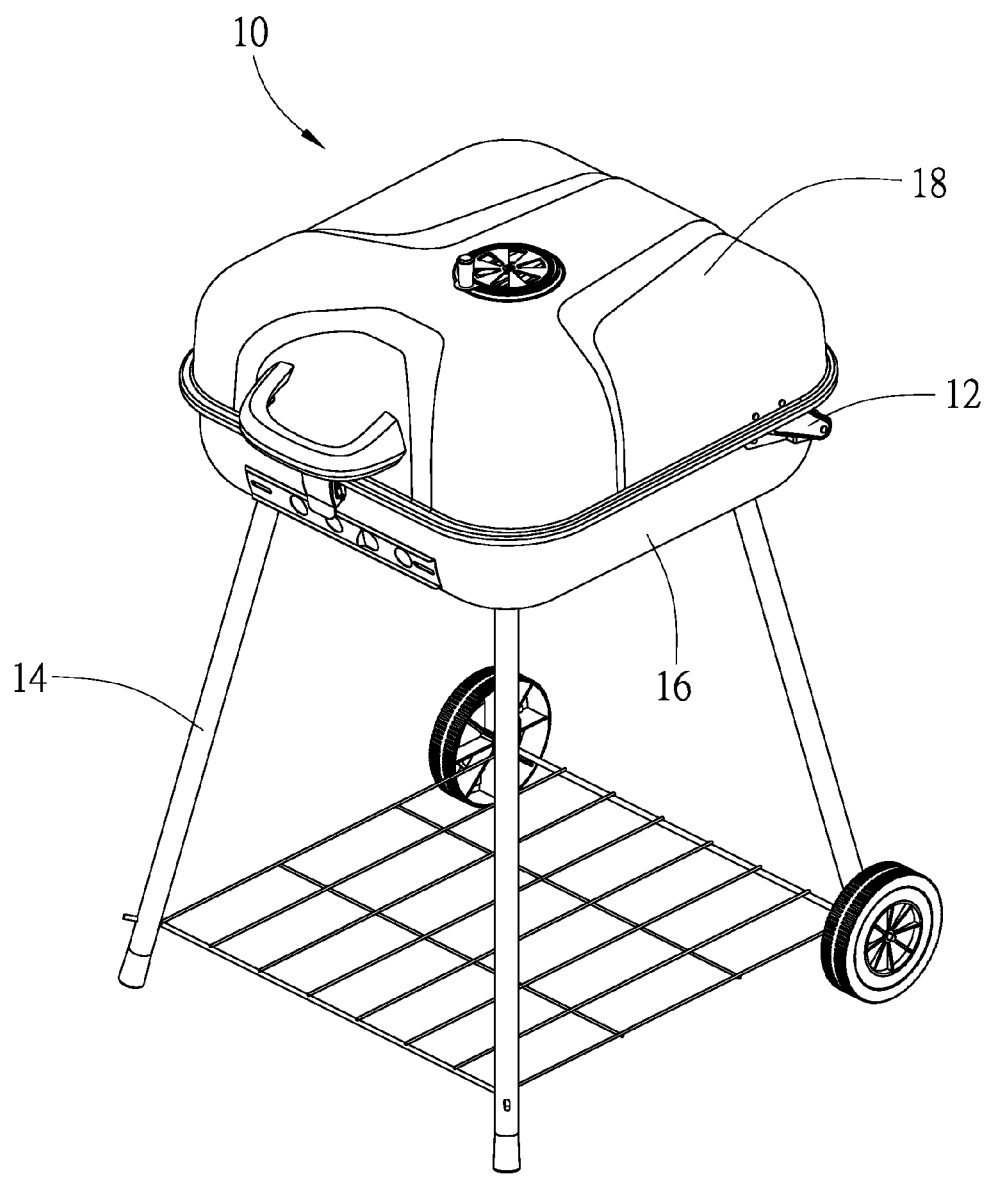
FIG. 1 is a perspective view of a grill equipped with a hinge according to the preferred embodiment of the present invention.
Figure 2:
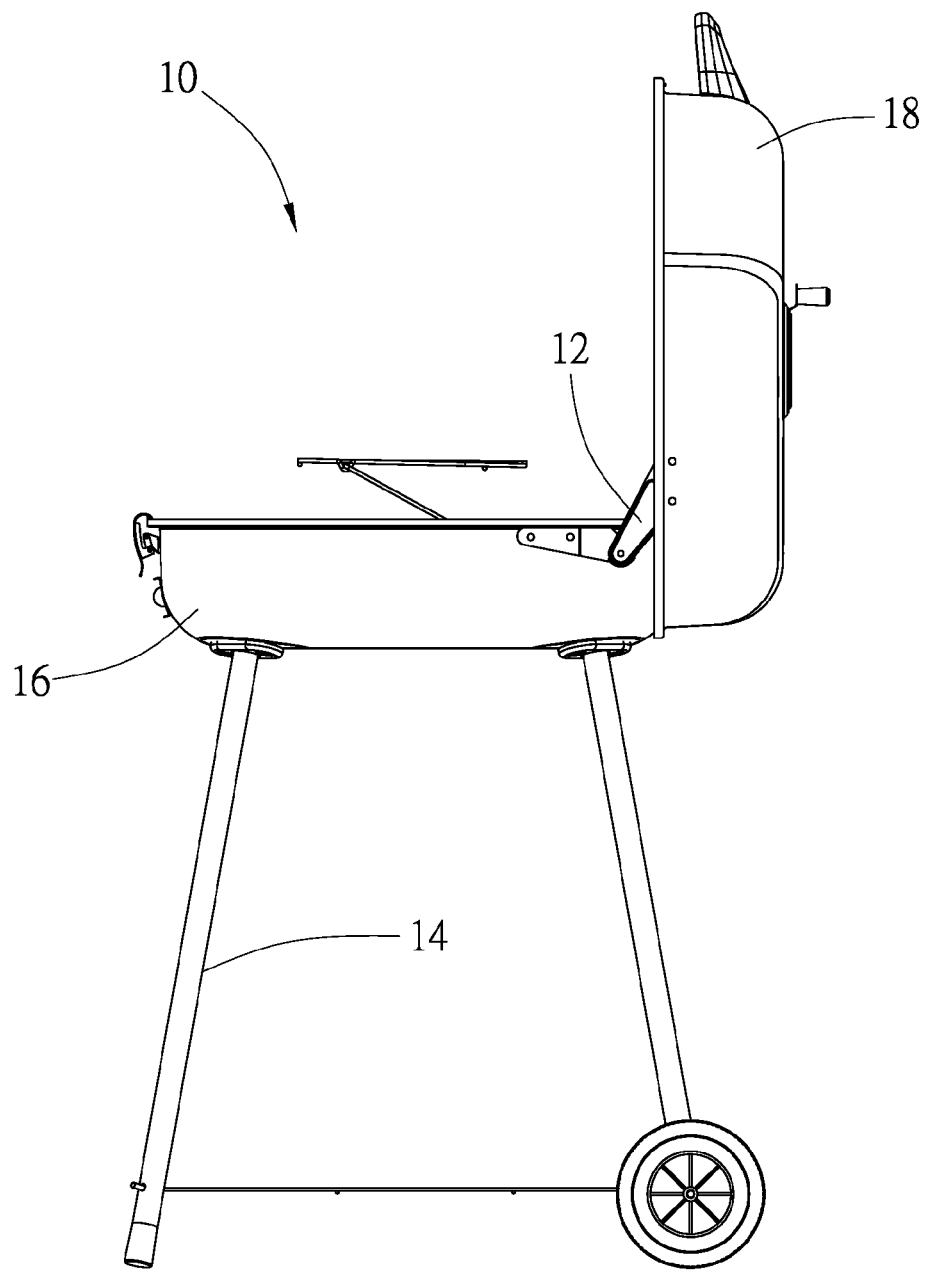
FIG. 2 is a side view of the grill equipped and the hinge shown in FIG. 1.

Referring to FIGS. 1 and 2, a grill 10 is equipped with two hinges 12 according to the preferred embodiment of the present invention. The grill 10 includes a stand 14, a bowl 16 supported on the stand 14, and a cover 18 connected to the bowl 16 by the hinges 12. The cover 18 is pivoted relative to the bowl 16 between a closing position and an opening position. The bowl 16 includes two lateral portions, and so does the cover 18. Each of the lateral portions of the bowl 16 is connected to a corresponding one of the lateral portions of the cover 18 by a corresponding one of the hinges 12. The following description will be given to only one of the hinges 12, and the corresponding one of the lateral portions of the bowl 16 and the corresponding one of the lateral portions of the cover 18.

Figure 3:
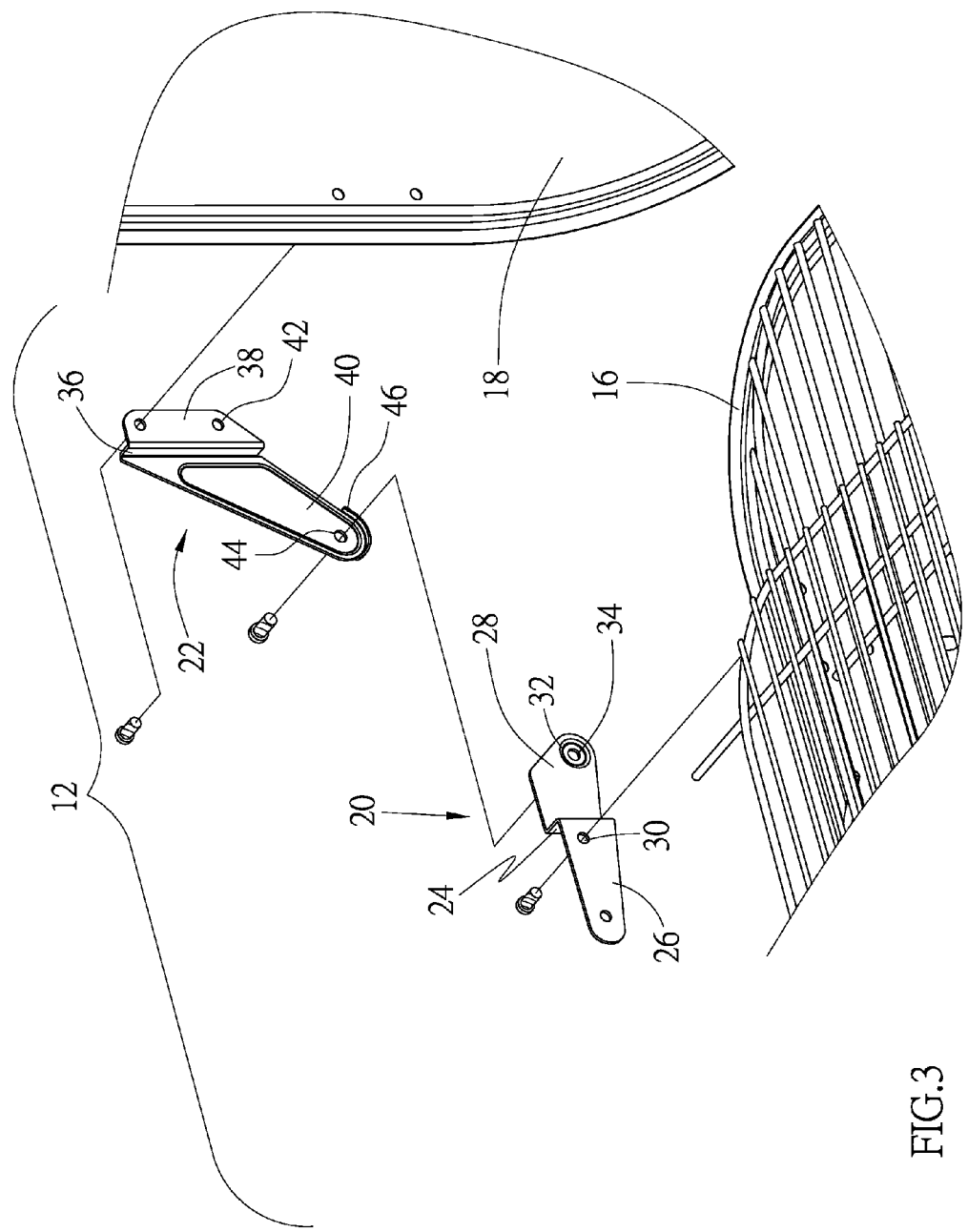
FIG. 3 is an exploded view of the hinge shown in FIG. 2.
Figure 4:
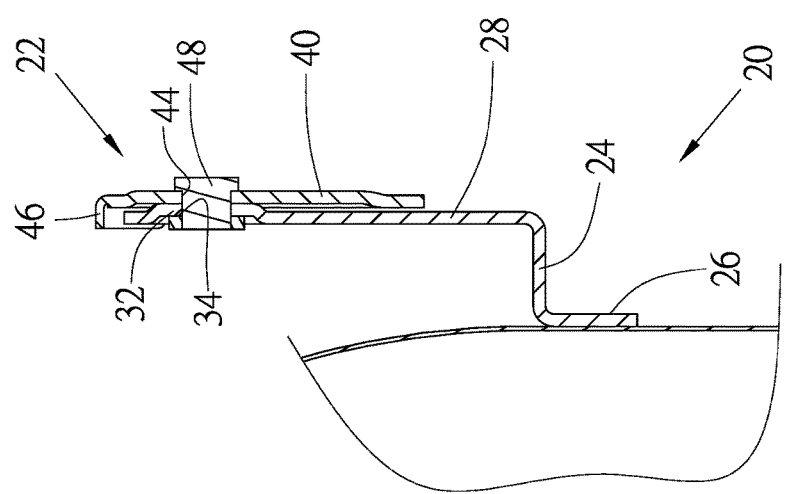
FIG. 4 is a cross-sectional view of the hinge shown in FIG. 3.

Referring to FIGS. 3 and 4, the hinge 12 includes two leaves 20 and 22. Each of the leaves 20 and 22 is made by bending a substantially triangular metal strip. The leaf 20 includes a middle portion 24 formed between two terminal portions 26 and 28. The middle portion 24 extends perpendicular to the terminal portions 26 and 28, which extend parallel to each other. The terminal portion 26 includes two apertures 30. The terminal portion 28 includes a hollow boss 32 that is formed with a convex face and a concave face. The hollow boss 32 includes an aperture 34.

The leaf 22 includes a middle portion 36 formed between two terminal portions 38 and 40. The middle portion 36 extends perpendicular to the terminal portions 38 and 40, which extend parallel to each other. The terminal portion 38 is made with two apertures 42. The terminal portion 28 is made with an aperture 44 and a flange 46 that extends in an arched manner around the aperture 44.

A fastener 48 such as a rivet is inserted in the apertures 34 and 44 so that the terminal portion 26 of the leaf 20 is pivotally connected to the terminal portion 40 of the leaf 22. The convex face of the hollow boss 32 is close to or in contact with an internal face of the flange 46. The pivoting of the leaves 20 and 22 relative to each other is smooth because the hollow boss 32 is guided by the flange 46. A head of the fastener 48 is inserted in a recess made by the concave face of the hollow boss 32 so that the head of the fastener 48 is provided by the hollow boss 32.

Two rivets (not numbered) are inserted in the apertures 30 and two apertures (not numbered) made in the bowl 16, thus connecting the leaf 20 to the bowl 16. Two rivets (not numbered) are inserted in the apertures 42 and two apertures (not numbered) made in the cover 18, thus connecting the leaf 22 to the cover 18.

The terminal portion 26 of the leaf 20 is in contact with an external face of the bowl 16. The terminal portion 38 of the leaf 22 is in contact with an internal face of the cover 18.

An end of the flange 46 of the leaf 22 is located close to an edge of the terminal portion 28 of the leaf 20 when the cover 18 is in the closing position. As the cover 18 is in the closing position, another end of the flange 46 of the leaf 22 is abutted against another edge of the terminal portion 28 of the leaf 20. Thus, the cover 18 is kept in the opening position.

With the cover 18 in the closing position, the middle portion 24 of the leaf 20 extends parallel and close to the middle portion 36 of the leaf 22. Now, the terminal portion 26 of the leaf 20 extends parallel and close to the terminal portion 38 of the leaf 22. Moreover, the terminal portion 28 of the leaf 20 extends parallel and close to the terminal portion 40 of the leaf 22.

Advantageously, the pivoting of the cover 18 relative to the bowl 16 is smooth for not being interfered with by any translation of the cover 18 relative to the bowl 16. The hinge 12 includes only a small number of elements so that it involves a simple structure and a low cost.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A hinge for connecting a cover to a bowl of a grill so that the cover can be pivoted relative to the bowl between a closing position and an opening position, the hinge comprising:
   a first leaf comprising a first terminal portion connected to the bowl, a second terminal portion, a middle portion formed between the first and second terminal portions, and a boss formed on the second terminal portion;
   a second leaf comprising a first terminal portion connected to the cover, a second terminal portion, a middle portion formed between the first and second terminal portions thereof, and a flange formed on the second terminal portion thereof, extending around the boss, and comprising an end located close to an edge of the second terminal portion of the first leaf and another end abutted against another edge of the second terminal portion of the first leaf when the cover is in the closing position; and
   a fastener for connecting the second terminal portion of the first leaf to the second terminal portion of the second leaf.

2. The hinge according to claim 1, wherein the middle portion of the first leaf extends perpendicular to the terminal first and second portions of the first leaf.

3. The hinge according to claim 1, wherein the middle portion of the second leaf extends perpendicular to the first and second terminal portions of the second leaf.

4. The hinge according to claim 1, wherein the middle portion of the first leaf extends parallel and close to the middle portion of the second leaf, and the first terminal portion of the first leaf extends parallel and close to the first terminal portion of the second leaf, and the second terminal portion of the first leaf extends parallel and close to the second terminal portion of the second leaf when the cover is in the closing position.

5. The hinge according to claim 1, wherein the boss comprises an aperture, wherein the second terminal portion of the second leaf comprises an aperture, wherein the fastener is inserted in the apertures.

* * * * *